United States Patent
Horng et al.

(10) Patent No.: US 8,058,759 B2
(45) Date of Patent: Nov. 15, 2011

(54) INNER-ROTOR-TYPE MOTOR

(75) Inventors: Alex Horng, Kaohsiung (TW);
Cheng-Te Liu, Kaohsiung (TW);
Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 218 days.

(21) Appl. No.: 12/436,858

(22) Filed: May 7, 2009

(65) Prior Publication Data
US 2010/0283344 A1    Nov. 11, 2010

(51) Int. Cl.
*H02K 5/16*    (2006.01)
*H02K 7/08*    (2006.01)

(52) U.S. Cl. ............... 310/91; 310/90; 310/401

(58) Field of Classification Search ............ 310/90, 310/91, 400, 412, 416, 425, 67 R
See application file for complete search history.

(56) References Cited

U.S. PATENT DOCUMENTS

| 6,713,926 | B2 | 3/2004 | Wauke | |
| 6,768,242 | B1 | 7/2004 | Suzuki et al. | |
| 7,095,146 | B2 * | 8/2006 | Fukazawa et al. | 310/89 |
| 7,129,608 | B2 | 10/2006 | Eppler et al. | |
| 2004/0145261 | A1 * | 7/2004 | Ganter et al. | 310/91 |

* cited by examiner

*Primary Examiner* — Tran Nguyen
*Assistant Examiner* — Eric Johnson
(74) *Attorney, Agent, or Firm* — Alan Kamrath; Kamrath & Associates PA

(57) ABSTRACT

An inner-rotor-type motor includes a housing, a stator, a rotor and a bearing seat. The stator is received in an assembly space of the housing. The rotor is rotatably positioned in the housing via a bearing and extends through a through-hole of the stator. The bearing seat includes a socket having a first recess and a second recess and couples to the assembly opening of the assembly space. A stopper is at least a part of the upper wall of the socket and arranged between the first recess and the second recess. The bearing can pass through an end of the socket and be positioned in the first recess, while a circuit board can pass through another end of the socket and be positioned in the second recess. Accordingly, the assembly is simplified, and the assembly convenience is improved.

11 Claims, 6 Drawing Sheets

INNER-ROTOR-TYPE MOTOR

BACKGROUND OF THE INVENTION

1. Field of the Invention

The present invention relates to an inner-rotor-type motor and, more particularly, to an inner-rotor-type motor with a bearing seat.

2. Description of the Related Art

FIG. 1 shows a conventional inner-rotor-type motor 8 having a bottom for a bearing seat 9 to mount on. The inner-rotor-type motor 8 substantially includes a housing 81, a stator 82 and a rotor 83. The housing 81 has a compartment 810, an upper opening 811 and a lower opening 812. The upper opening 811 and the lower opening 812 communicate with the top and bottom of the compartment 810 respectively. The stator 82 with a through-hole 821 is mounted in the compartment 810. The through-hole 821 has two ends in the form of openings communicating with the upper opening 811 and the lower opening 812 in alignment. The rotor 83 has a shaft 831 arranged along an axle thereof. The rotor 83 is rotatably coupled to housing 81 through the bearing 84, with the shaft 831 being received in the through-hole 821 of the stator 82 and extending through the upper opening 811.

Referring to FIG. 2, the bearing seat 9 is mounted in the lower opening 812 of the housing 81. The bearing seat 9 includes a socket 91 and a base 92. The socket 91 is coupled to the lower opening 812 of the housing 81. The socket 91 has a first recess 911, a second recess 912 and a plurality of apertures 913. The first recess 911 is formed on a side of the second recess 912 and communicating with the second recess 912, with the inner diameter of the first recess 911 being smaller than that of the second recess 912. The first recess 911 is for receiving the bearing 84, and the second recess 912 is for receiving a circuit board 85. Moreover, the first recess 911 forms an opening 914 on a top of the socket 91, and the second recess 912 forms an opening 915 on a bottom of the socket 91. The shaft 831 has an end extending through the opening 914 into the first recess 911 and coupling to the bearing 84 received in the first recess 911. The apertures 913 are formed on the top of the socket 91, communicate with the second recess 912 for wires of the stator 82 to extend through the apertures 913 into the second recess 912, and are electrically connected to the circuit board 85. The base 92 covers the opening 915 on the bottom of the socket 91 in alignment.

In general, for preventing the bearing 84 in the first recess 911 from falling into the through-hole 821 of the stator 82, the opening 914 on the top of the bearing seat 9 narrows inwards to form a shoulder 916 for cooperating with a fastener 86 to restrict the bearing 84 in the first recess 911. However, forming the shoulder 916 decreases the inner diameter of the opening 914, so the bearing 84 and circuit board 85 in the first recess 911 and the second recess 912 can be arranged only by sequentially passing through the opening 915 on the bottom of the socket 91. Besides, the apertures 913 are formed on the top of the socket 91, so the wires need to pass through the apertures 913 for entering the second recess 912, thus causes causing assembly inconvenience.

With the trend toward miniaturization of the motor sizes, the conventional inner-rotor-type motor diminishes accordingly and the first recess 911 is barely enough to receive the bearing 84, so mounting the fastener 86 on the end of the shaft 831 in the first recess 911 is not easy in assembly, thus increasing the assembly difficulties. Hence, there is a need for an improvement over the conventional inner-rotor-type motor.

SUMMARY OF THE INVENTION

It is therefore the primary objective of this invention to provide an inner-rotor-type motor that improves the assembly convenience of the inner-rotor-type motor.

An inner-rotor-type motor according to the preferred teachings of the present invention includes a housing, a stator, a rotor and a bearing seat. The housing includes an assembly space. The stator is received in the assembly space. The rotor is rotatably positioned in the housing via a bearing and extends through a through-hole of the stator. The bearing seat includes a socket and couples to the assembly opening of the assembly space. A first recess is defined by an upper wall of the socket, while a second recess is defined by the upper wall and a circumferential side wall of the socket.

A stopper is at least a part of the upper wall of the socket and arranged between the first recess and the second recess. The bearing can pass through an end of the socket and be positioned in the first recess, while a circuit board can pass through another end of the socket and be positioned in the second recess, for one to complete the assembly of the inner-rotor-type motor. Accordingly, the assembly is simplified, and the assembly convenience is improved.

The socket has a plurality of slits arranged in the circumferential side wall of the socket and a plurality of coupling portions. Each one of the coupling portions is a laterally extending groove formed at the closed end of the slits. The slits and coupling portions communicate with the second recess, and, thus, wires of the stator are guided into the second recess through the slits of the socket. Accordingly, the assembly convenience is improved.

Further scope of the applicability of the present invention will become apparent from the detailed description given hereinafter. However, it should be understood that the detailed description and specific examples, while indicating preferable embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
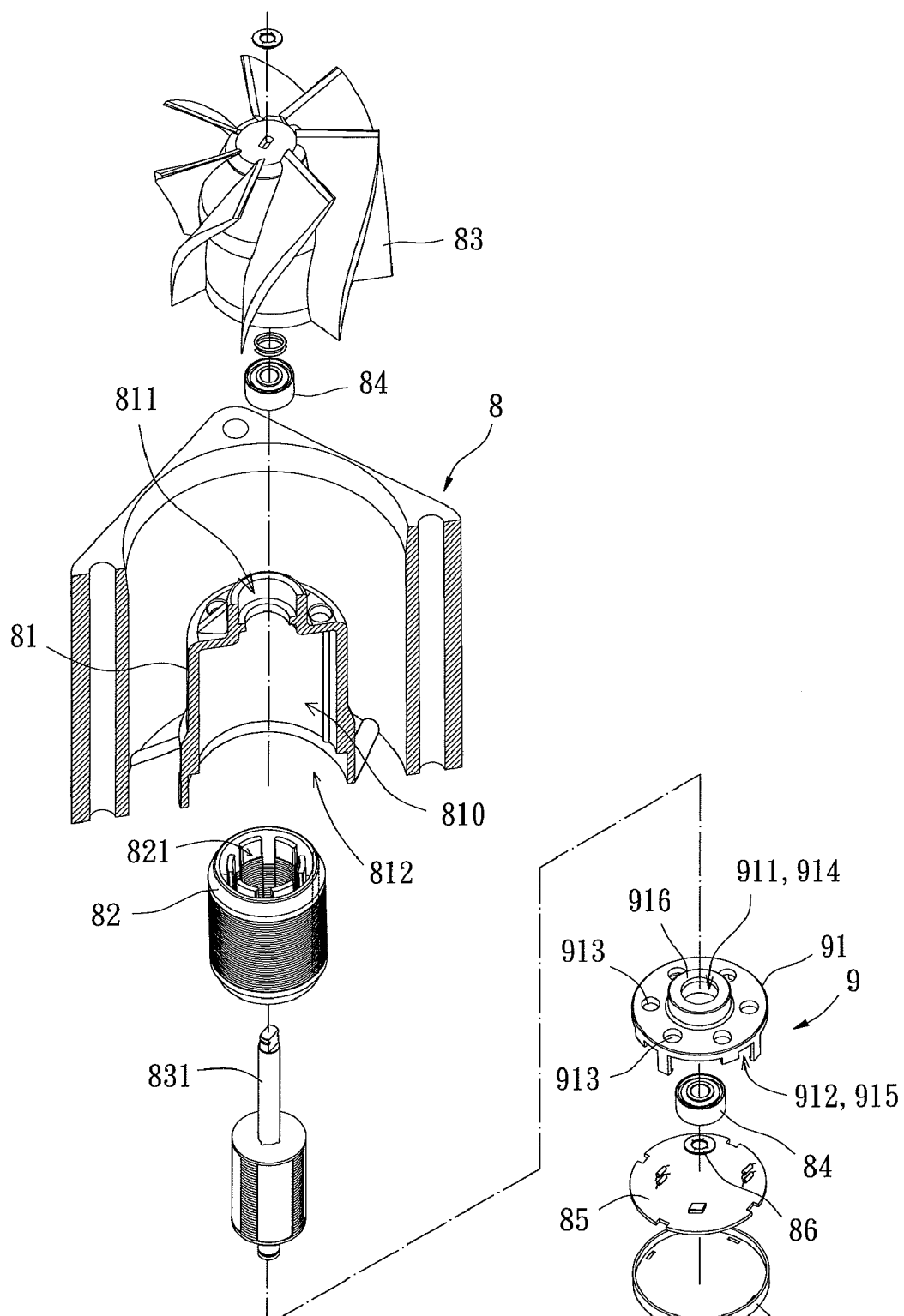
FIG. 1 is an exploded perspective view illustrating a conventional inner-rotor-type motor.
Figure 2:
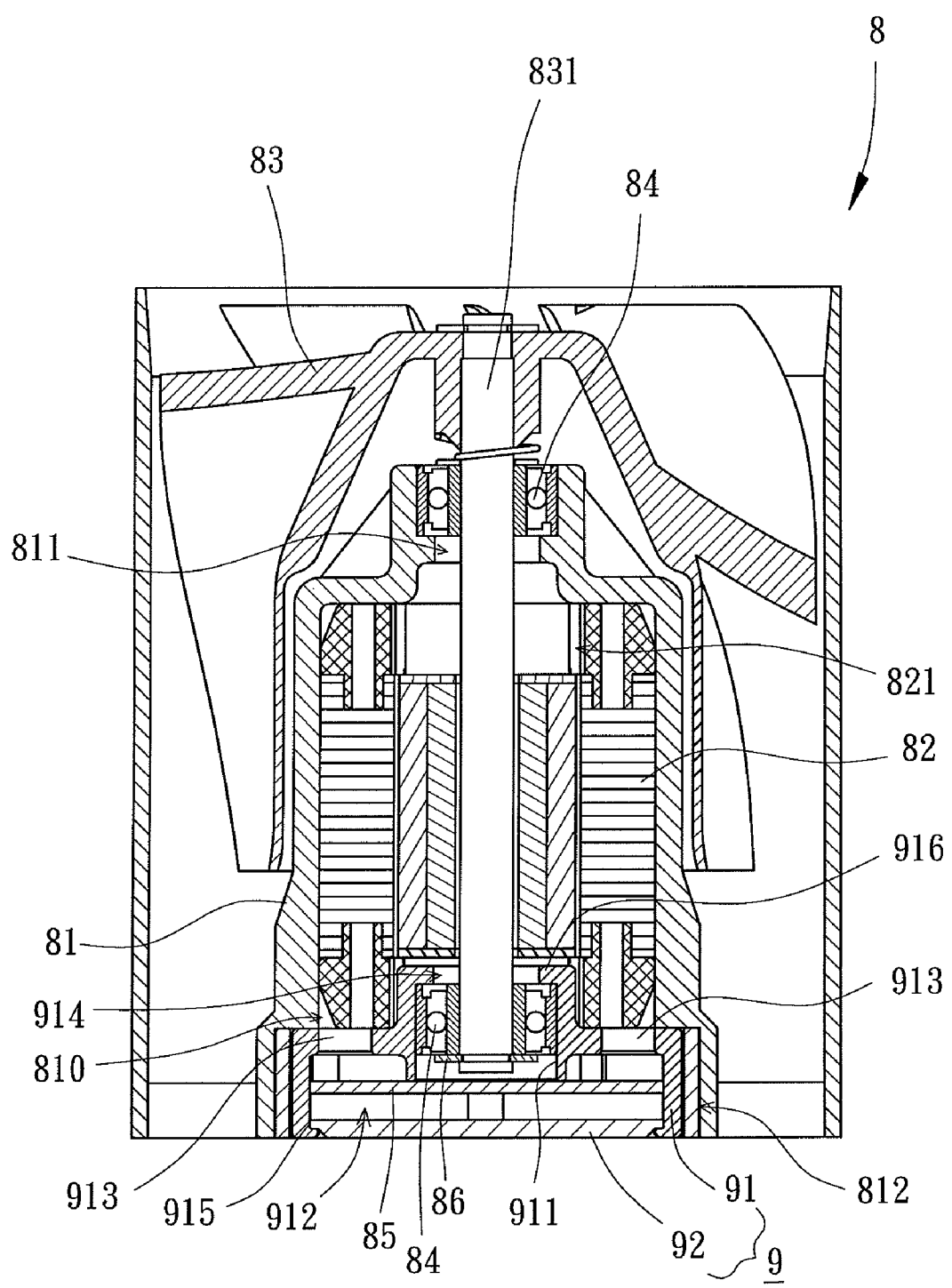
FIG. 2 is a cross sectional view illustrating the conventional inner-rotor-type motor of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "inner", "outer", "lower", "end", "portion", "top", "bottom", "axial", "spacing", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
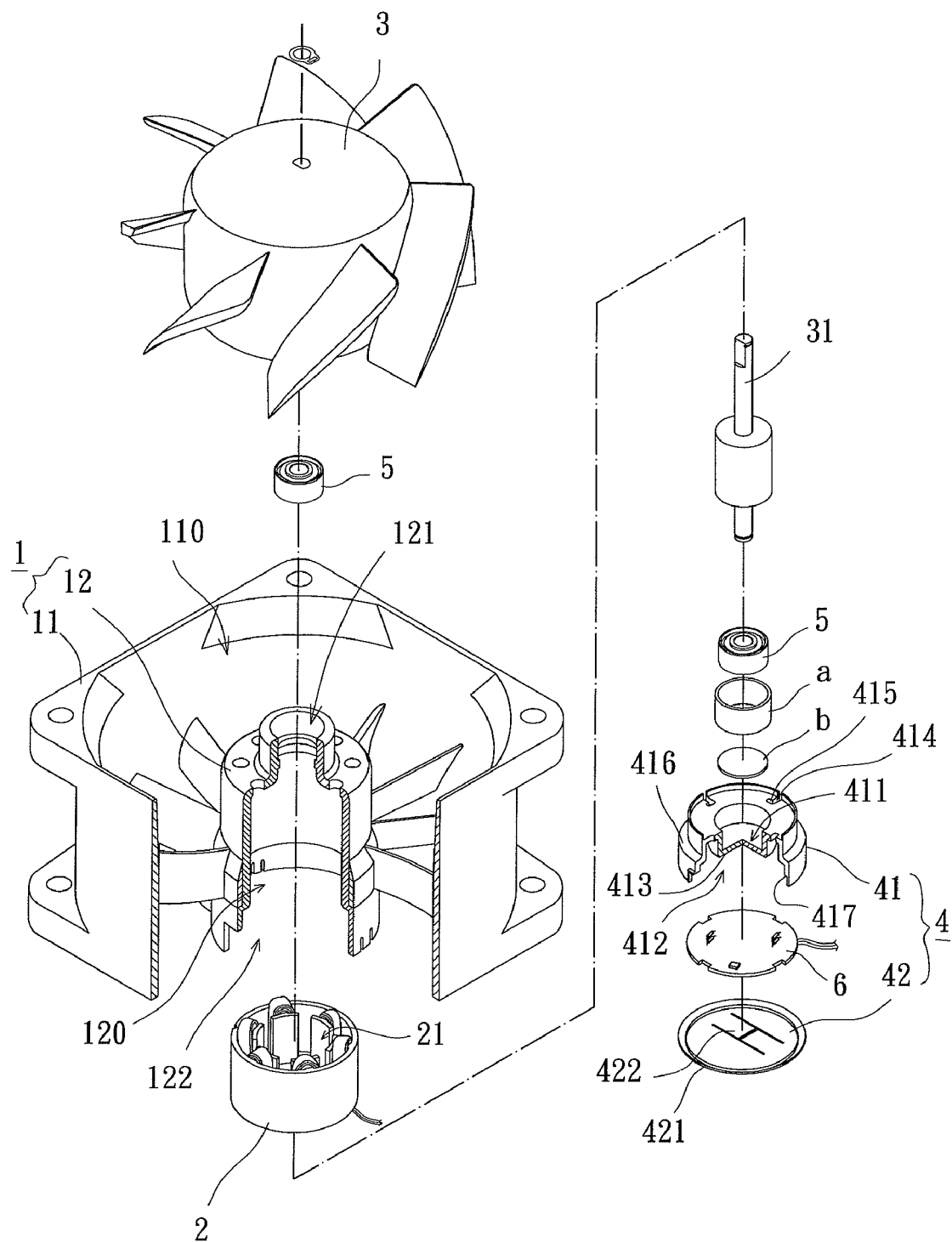
FIG. 3 is an exploded perspective view illustrating an inner-rotor-type motor in accordance with preferred teachings of the present invention.

Referring to FIG. 3, the inner-rotor-type motor in accordance with the preferred teachings of the present invention includes a housing 1, a stator 2, a rotor 3 and a bearing seat 4. The stator 2 and the rotor 3 are received in the housing 1, and the bearing seat 4 is mounted on a bottom of the housing 1.

In detail, the housing 1 includes an outer shell 11 and an inner shell 12. The outer shell 11 has a compartment 110 to receive the inner shell 12. The inner shell 12 is a hollow shell with an assembly space 120, a shaft hole 121 and an assembly opening 122. The shaft hole 121 and the assembly opening 122 communicate with the top and the bottom of the assembly space 120 respectively. The stator 2 with a through-hole 21 is received in the assembly space 120. The through-hole 21 has two openings on two ends thereof communicating with the shaft hole 121 and the assembly opening 122 of the inner shell 12 in alignment. The rotor 3 has a shaft 31 arranged along an axle, and the shaft 31 extends through and is rotatably positioned in the through-hole 21 via a bearing 5.

Figure 4:
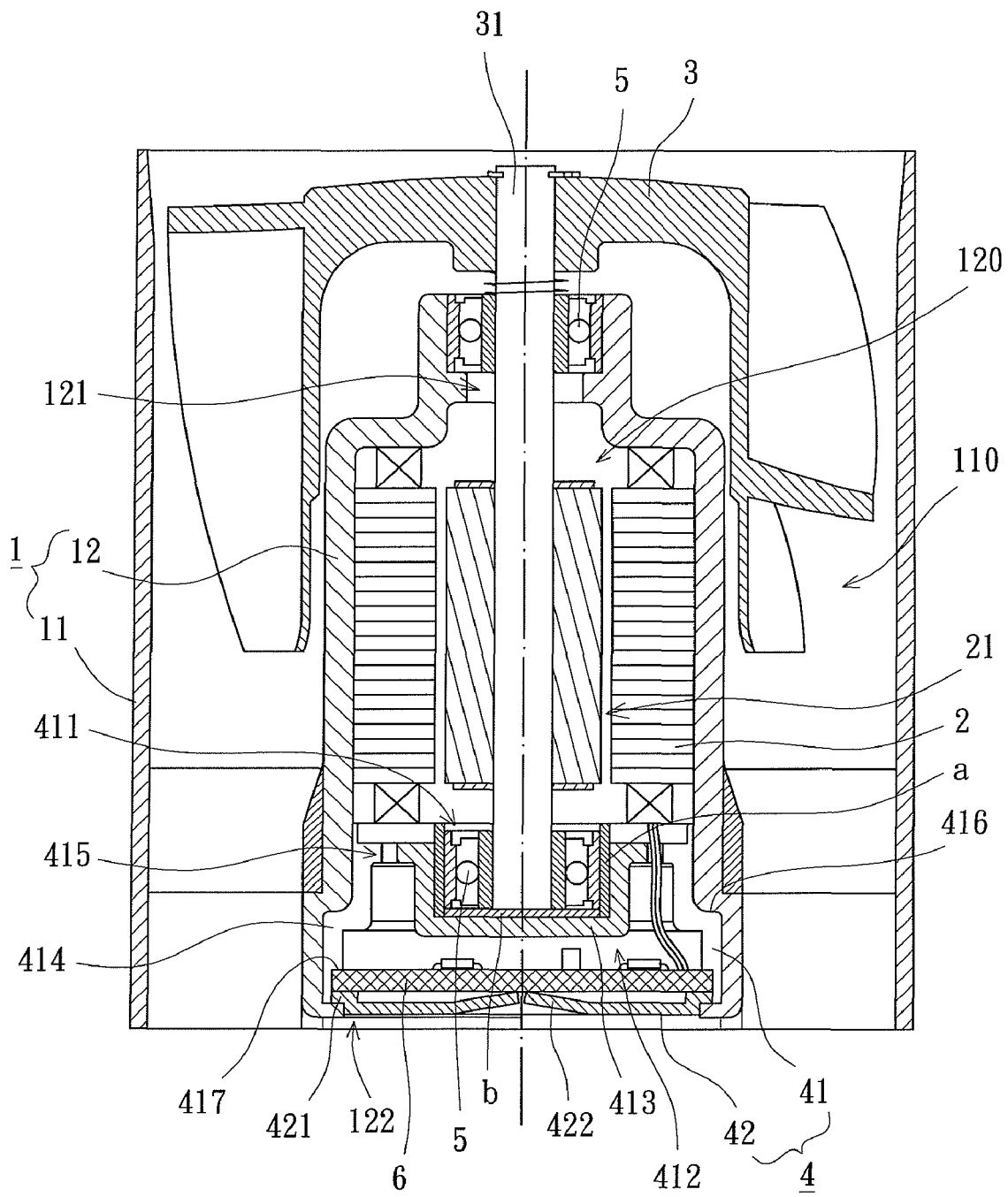
FIG. 4 is a cross sectional view illustrating the inner-rotor-type motor of FIG. 3.

Referring to FIGS. 3 and 4, the bearing seat 4 in accordance with the preferred teachings of the present invention includes a socket 41 and a base 42. The socket 41 has a first recess 411, a second recess 412, a stopper 413, a plurality of slits 414, a plurality of coupling portion 415, a first positioning portion 416 and a second positioning portion 417. The first recess 411 with an opening formed at an end of the socket 41 (the upper end of the socket 41 in this embodiment) is defined by an upper wall of the socket 41, while the opening of the first recess 411 has a diameter not less than an outer diameter of the bearing 5. Oppositely, the second recess 412 with another opening formed at another end of the socket 41 (the lower end of the socket 41 in this embodiment) is defined by the said upper wall and a circumferential side wall of the socket 41. Preferably, an abutting ring 'a' is mounted in the first recess 411 and made of a metal material with high mechanical intensity (e.g. iron, copper, steel, or alloy of metals). The abutting ring 'a' leans against an inner periphery of the first recess 411 to elevate the structural strength of the first recess 411. The stopper 413 is at least a part of the upper wall of the socket 41 and arranged between the first recess 411 and the second recess 412 for separating the said two recesses 411, 412.

Moreover, each of the slits 414 is arranged in the circumferential side wall of the socket 41 and has a closed end forming the coupling portion 415. Specifically, in the upper wall of the socket 41, each one of the coupling portions 415 of the slits 414 is preferably a laterally extending groove formed at the closed end, with an angle between extending directions of the slit 414 and coupling portion 415. Besides, the slits 414 and the coupling portions 415 communicate with the second recess 412. The first positioning portion 416 is formed on an outer periphery of the circumferential side wall of the socket 41, while the second positioning portion 417 is formed on an inner periphery of the side wall of the socket 41 and close to the opening of the second recess 412. Besides, the first positioning portion 416 and the second positioning portion 417 are selected from stepped structures for positioning. The base 42 has a shoulder 421 and a plurality of pressing portion 422. The shoulder 421 forms an outer periphery of the base 42, while the pressing portion 422 is flexibly formed in a center of the base 42.

Figure 5A:
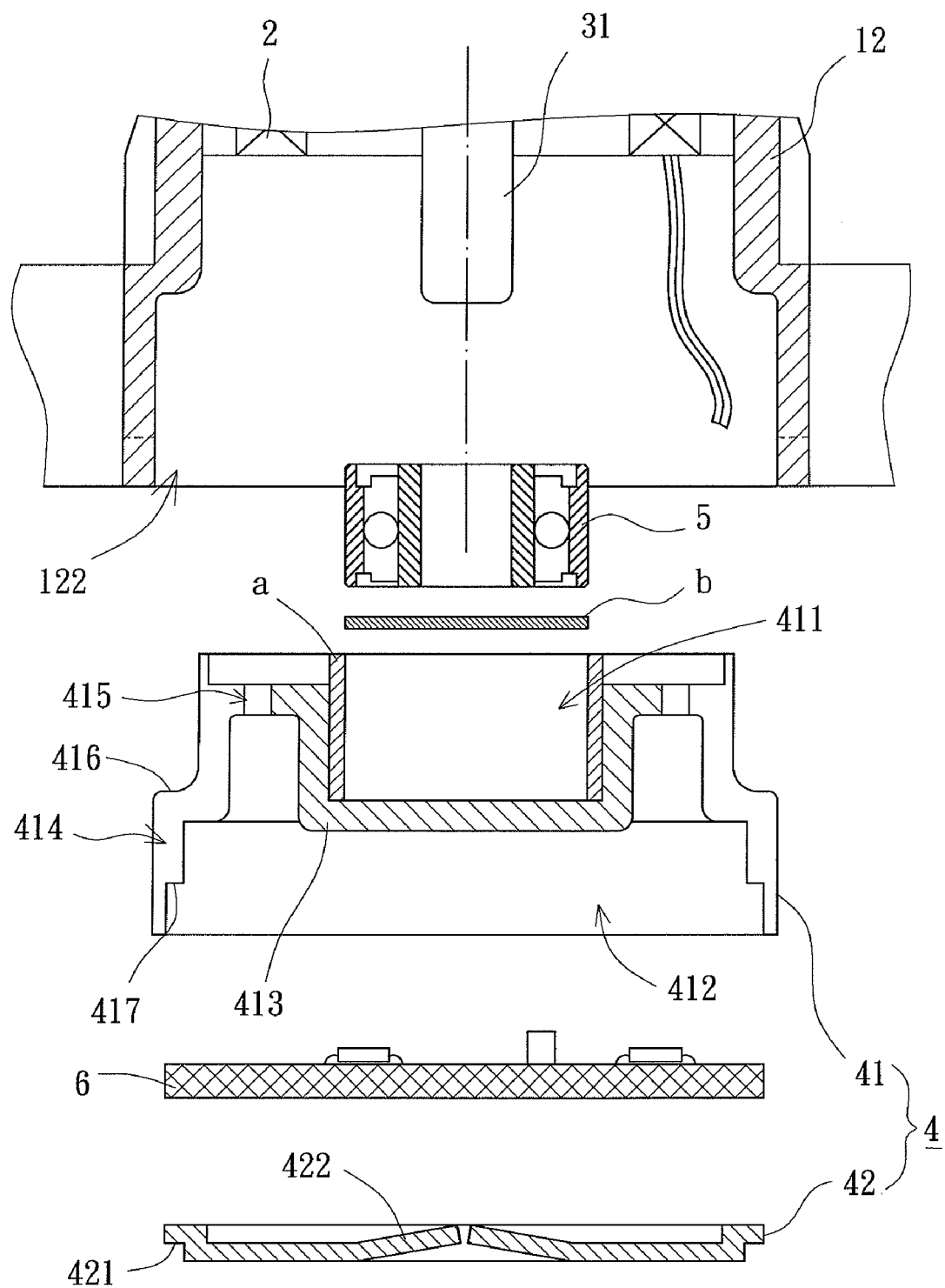
FIG. 5a is a partial, cross sectional view of the inner-rotor-type motor of FIG. 3 before assembly.
Figure 5B:
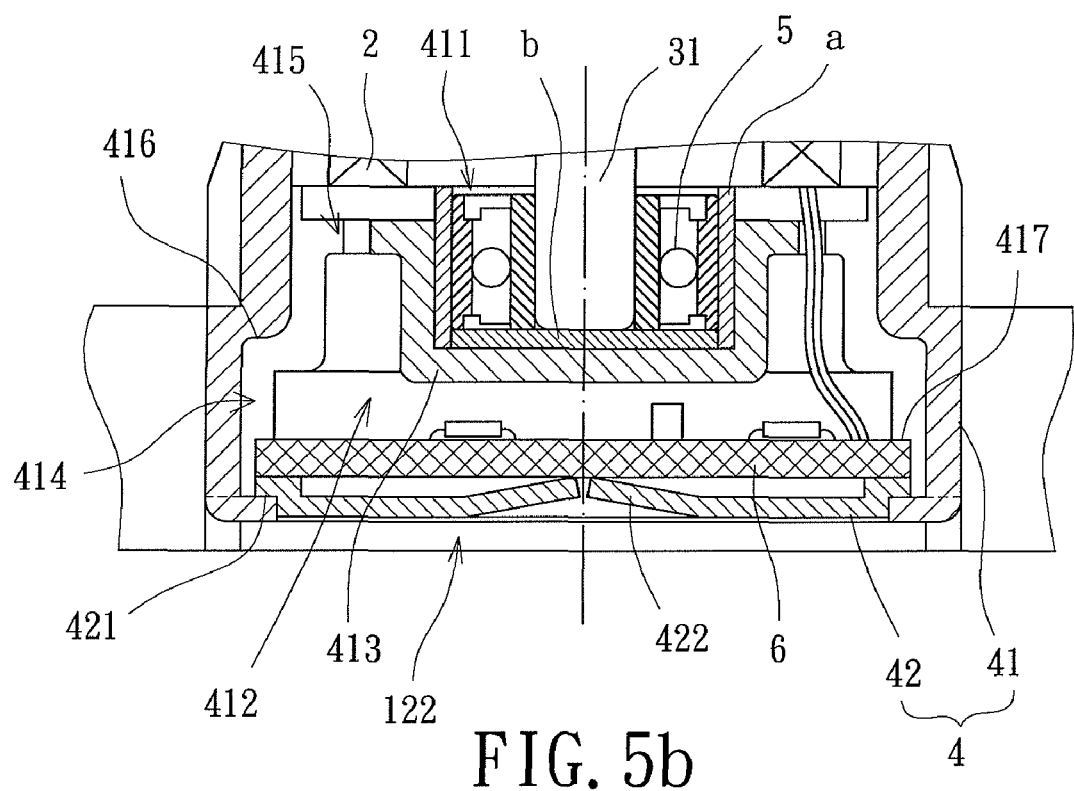
FIG. 5b is a partial, cross sectional view of the inner-rotor-type motor of FIG. 3 after assembly.

Referring to FIGS. 5a and 5b, briefly, for completing the assembly of the inner-rotor-type motor of the preferred teachings of the present invention, the stator 2 is firstly disposed in the assembly space 120 of the inner shell 12, the shaft 31 of the rotor 3 is then inserted into the through-hole 21 of the stator 2 after passing through the shaft hole 121, and the bearing seat 4 is finally coupled to the assembly opening 122 of the inner shell 12.

Specifically, while the bearing seat 4 couples to the assembly opening 122, with the stopper 413 formed between the first recess 411 and the second recess 412, the bearing 5, designed to couple with the shaft 31, can directly pass through the opening of the first recess 411 and be positioned in the first recess 411. Further, a circuit board 6 can pass through the opening of the second recess 412 and be positioned in the second positioning portion 417 of the second recess 412. Besides, when the shaft 31 couples to the bearing 5 in the first recess 411, an end of the shaft 31 passing through the bearing 5 leans against a side of the stopper 413. Preferably, a wear-proof plate 'b' mounted in the first recess 411 leans against a side of the stopper 413. The wear-proof plate 'b' on the interface between the said end of the shaft 31 and the stopper 413 prevents the shaft 31 and the stopper 413 from wearing out during rotation.

Figure 6:
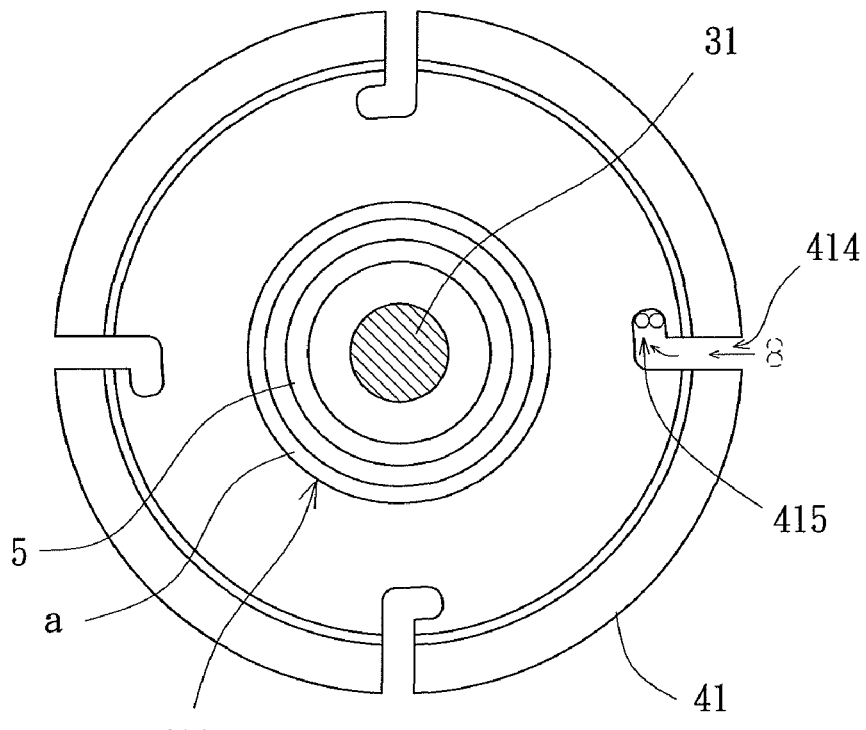
FIG. 6 is a partial, enlarged, top view of the inner-rotor-type motor of FIG. 3.

Next, referring to FIG. 6, wires of the stator 2 are guided into the second recess 412 through the slits 414 of the socket 41. With the difference between the extending directions of any one of the slits 414 and the coupling portion 415 of the slit 414, the wires can be firmly fixed in the coupling portion 415 without disengaging from the second recess 412 through the slits 414. Therefore, electrical connection between the wires of the stator 2 and the circuit board 6 in the second recess 412 is easily achieved and firmly maintained. At last, the base 42 is coupled to the opening of the second recess 412, and, then, a rim of the inner shell 12 around the assembly opening 122 is bent to engage with the shoulder 421 of the base 42. As a result, a fixed position of the base 42 relative to the opening of the second recess 412 is provided.

Preferably, the base 42 is selected from a metal sheet so that the pressing portion 422 of the base 42 can be bent by an external force to support the circuit board 6, for the circuit board 6 to be steadily disposed in the second recess 412. Accordingly, assembly reliability is elevated.

Accordingly, through the design and arrangement of the first recess 411, the second recess 412, and the stopper 413 of the socket 41, the bearing 5 and the circuit board 6 can be mounted into the first and second recesses 411, 412 respectively from the opposite ends of the socket 41 (upper and lower ends) without restriction in available space and assembly order during the assembly of the inner-rotor-type motor. Also, instead of the use of a fastener or a C-ring, the socket 41 fixes the bearing 5 in the first recess 411 steadily only with the stopper 413, and the assembly is, therefore, simplified.

Moreover, through the slits 414 and the coupling portion 415 of the socket 41, the wires of the stator 2 can pass through the slits 414 into the second recess 412 and be positioned in the coupling portion 415. Thus, the assembly convenience of the inner-rotor-type motor is improved.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An inner-rotor-type motor comprising:
    a housing including an assembly space and an assembly opening communicating with the bottom of the assembly space;
    a stator received in the assembly space;
    a rotor rotatably positioned in the housing via a bearing;
    a bearing seat including a socket and coupled to the assembly opening of the assembly space, with the socket including an upper wall and a circumferential side wall, with the circumferential side wall including an inner surface, an outer surface opposite to the inner surface and a free edge opposite to the upper wall, wherein a first recess with an opening formed at an end of the socket is defined by the upper wall of the socket, a second recess with another opening formed at another end of the socket is defined by the said upper wall and the inner surface of the circumferential side wall of the socket, and a stopper is at least a part of the upper wall of the socket and arranged between the first recess and the second recess;
    a base coupled to the opening of the second recess, wherein the base has a plurality of pressing portions flexibly formed in a center of the base;
    a circuit board electronically connected to the stator, with the plurality of pressing portions supporting the circuit board in the second recess;
    at least one slit extending axially from the free edge through the upper wall and extending radially between the inner and outer surface of the circumferential side wall, with the slit communicating with the second recess; and
    at least one coupling portion formed at a closed end of the at least one slit and extending axially through the upper wall and communicating with the second recess, with the at least one coupling portion extending in a non-radial extending direction from a radial extending direction of the slit to define a non-parallel angle therebetween.

2. The inner-rotor-type motor as defined in claim 1, wherein the at least one slit comprises a plurality of slits arranged in the circumferential side wall of the socket and communicating with the second recess.

3. The inner-rotor-type motor as defined in claim 2, wherein the at least one coupling portion comprises a plurality of coupling portions, with each one of the coupling portions formed at the closed end of one of the plurality of slits.

4. The inner-rotor-type motor as defined in claim 1, wherein the opening of the first recess has a diameter not less than an outer diameter of the bearing.

5. The inner-rotor-type motor as defined in claim 1, wherein the socket has a first positioning portion formed on an outer periphery of the circumferential side wall of the socket and a second positioning portion formed on an inner periphery of the side wall of the socket close to the opening of the second recess.

6. The inner-rotor-type motor as defined in claim 4, wherein the socket has a first positioning portion formed on an outer periphery of the circumferential side wall of the socket and a second positioning portion formed on an inner periphery of the side wall of the socket close to the opening of the second recess.

7. The inner-rotor-type motor as defined in claim 6, wherein the first positioning portion and the second positioning portion are selected from stepped structures.

8. The inner-rotor-type motor as defined in claim 1, wherein the base has a shoulder, with the shoulder forming an outer periphery of the base, and wherein the housing includes a rim received in the shoulder, with the base located intermediate the circuit board and the rim of the housing.

9. The inner-rotor-type motor as defined in claim 7, wherein the base has a shoulder, with the shoulder forming an outer periphery of the base, and wherein the housing includes a rim received in the shoulder, with the base located intermediate the circuit board and the rim of the housing.

10. The inner-rotor-type motor as defined in claim 1, further comprising an abutting ring leaning against an inner periphery of the first recess and made of a metal material.

11. The inner-rotor-type motor defined in claim 1, further comprising a wear-proof plate mounted in the first recess and leaning against a side of the stopper.

* * * * *